United States Patent
Hofler et al.

(10) Patent No.: US 7,641,589 B2
(45) Date of Patent: Jan. 5, 2010

(54) MOTOR VEHICLE EQUIPPED WITH A SERVICE BRAKE AND WITH A PARKING BRAKE

(75) Inventors: Hans Hofler, Immenstaad (DE); Karl Kuhner, Friedrichshafen (DE); Wolfgang Rebholz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 373 days.

(21) Appl. No.: 11/667,634

(22) PCT Filed: Oct. 27, 2005

(86) PCT No.: PCT/EP2005/011483

§ 371 (c)(1),
(2), (4) Date: May 11, 2007

(87) PCT Pub. No.: WO2006/053630

PCT Pub. Date: May 26, 2006

(65) Prior Publication Data

US 2007/0298930 A1 Dec. 27, 2007

(30) Foreign Application Priority Data

Nov. 19, 2004 (DE) .................. 10 2004 055 960

(51) Int. Cl.
*B60W 10/06* (2006.01)
*B60W 10/18* (2006.01)

(52) U.S. Cl. .................. 477/188; 477/206; 188/106 P; 303/89

(58) Field of Classification Search ............ 477/9, 477/27, 28, 182, 184, 186, 188, 206, 208, 477/210, 211
See application file for complete search history.

(56) References Cited

U.S. PATENT DOCUMENTS

| 4,106,601 | A | * | 8/1978 | Fischer .................. 477/210 |
| 4,407,399 | A | | 10/1983 | Wolff |
| 5,009,126 | A | | 4/1991 | Meisinger et al. |
| 6,881,175 | B2 | * | 4/2005 | Loibl .................. 477/182 |
| 6,949,042 | B2 | | 9/2005 | Eymuller et al. |
| 6,997,521 | B2 | | 2/2006 | Jensen et al. |
| 2004/0011609 | A1 | | 1/2004 | Schmid |

FOREIGN PATENT DOCUMENTS

| DE | 30 03 831 A1 | 8/1981 |
| DE | 101 14 435 A1 | 10/2002 |
| DE | 103 39 245 A1 | 4/2004 |
| EP | 0 395 657 | 11/1990 |
| EP | 0 687 604 A2 | 12/1995 |
| EP | 1 291 258 A1 | 7/2002 |
| EP | 1 384 019 A0 | 1/2004 |
| GB | 1529761 | 10/1978 |
| WO | WO 02/090800 A1 | 11/2002 |

* cited by examiner

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

A motor vehicle with a parking brake (3) which, in addition to functioning as a parking brake (3), may also be used as an auxiliary brake for assisting the main brake (2) and/or a sustained-action brake. The parking brake (3) is preferably incorporated in the transmission (1) of the vehicle and designed as a rotary disk brake in an oil bath.

15 Claims, 1 Drawing Sheet

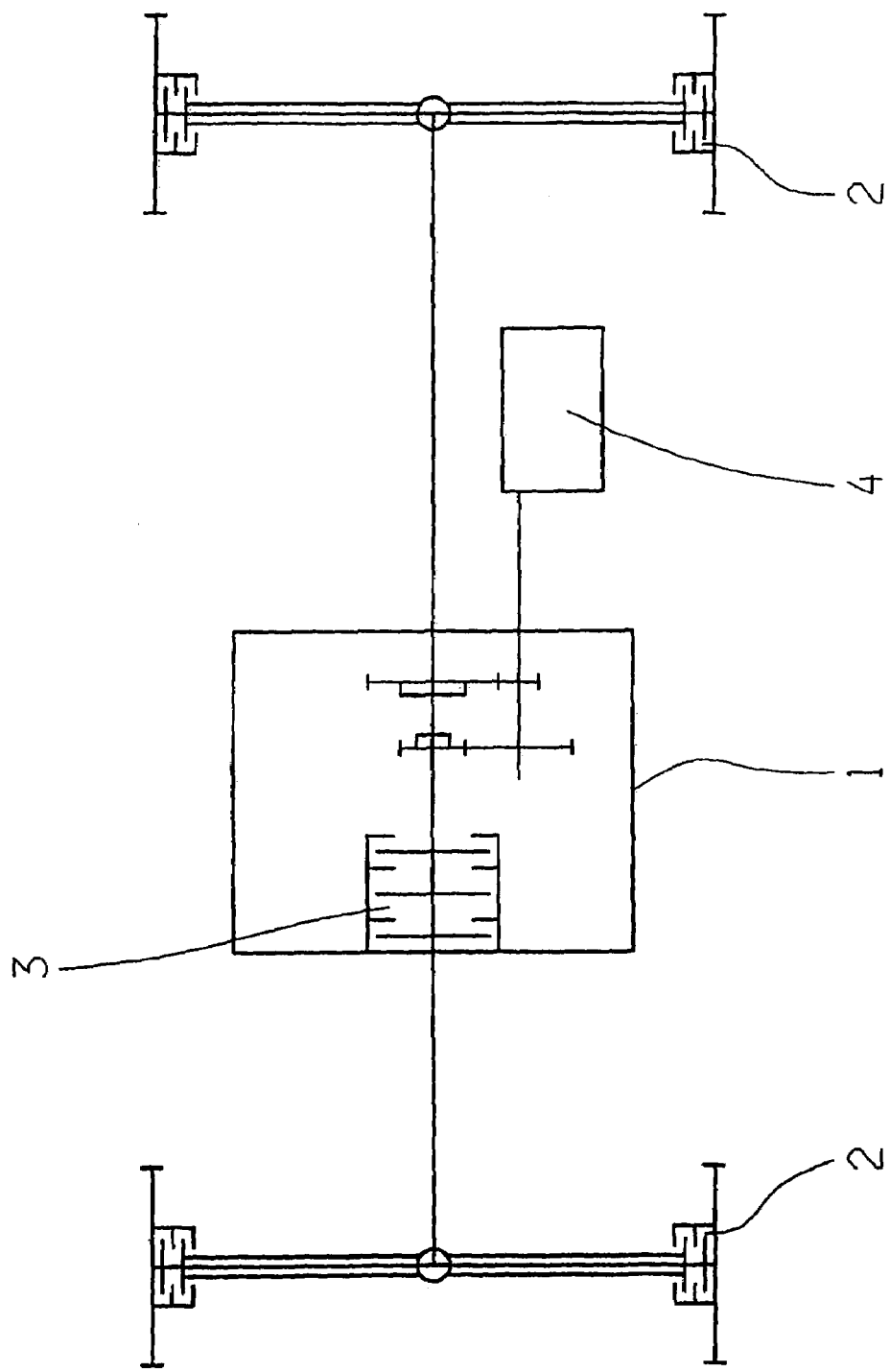

MOTOR VEHICLE EQUIPPED WITH A SERVICE BRAKE AND WITH A PARKING BRAKE

This application is a national stage completion of PCT/EP2005/011483 filed Oct. 27, 2005 which claims priority from German Application Serial No. 10 2004 055 960.0 filed Nov. 19, 2004.

FIELD OF THE INVENTION

The present invention relates to a motor vehicle with a main brake and a parking brake. The invention further relates to a procedure for the operation of the parking brake according to the present invention.

BACKGROUND OF THE INVENTION

The use of parking brakes is well-known in the prior art. Parking brakes are especially used in construction and work machines, for example, wheel loaders, shovel dozers or dumpers. Parking brakes are usually arranged as friction brakes that are attached to the transmission or arranged in the powertrain, being designed as air cooled brakes, for example drum or plate brakes, as well as oil cooled brakes, for example rotary disk brakes in an oil bath.

Prior art solutions including air cooled parking brakes have the disadvantage of contamination causing an increase wear and tear. In oil cooled parking brakes the available braking power is restricted because of its reduced volume; furthermore, in addition high drag torque is also disadvantageously generated. Prior art parking brakes can only conditionally be used as auxiliary brakes for main brakes because the input power is limited during continuous braking; the total thermal energy is not dissipated via an active cooling system but via thermal radiation.

From DE 103 39 245 A1, a brake control system for a vehicle comprising a parking brake is known, where the main brakes of the vehicle are operated instead of, or in addition to, the parking brake when the parking brake is controlled by the driver, and the speed of the vehicle exceeds a specified speed range, in order to protect the parking brake. Furthermore, the parking brake is only disengaged once the main brake is operating within a specified range. This ensures that the main brakes are primed and full braking power is available to the driver.

SUMMARY OF THE INVENTION

The object of the present invention is to disclose a motor vehicle with a parking brake, in particular for a work machine or industrial truck, by which the above mentioned disadvantages are avoided. Furthermore, a procedure for the operation of the parking brake according to the present invention will be disclosed.

This problem is solved for a motor vehicle with a parking brake.

Thus, a motor vehicle with a parking brake is proposed that can be operated independently of the main brake, and can decelerate the vehicle alone or in combination with the main brake. In a further embodiment, the parking brake is incorporated in the transmission. The parking brake according to the present invention is preferably designed as a rotary disk brake in an oil bath.

BRIEF DESCRIPTION OF THE DRAWINGS

The invention will now be explained in more detail with reference to the exemplary embodiment in which:

The sole drawing is a schematic representation of a motor vehicle with a main brake and a parking brake.

DETAILED DESCRIPTION OF THE DRAWINGS

The concept according to the present invention prevents contamination, and consequently increased wear and tear, because the brake is protectively mounted in the transmission housing 1.

The parking brake 3 according to the present invention is preferably arranged in the transmission between the last gear clutch and the output flange and is located in the transmission sump.

According to a particularly advantageous embodiment of the present invention, the parking brake 3 is arranged as a negative clutch closing via spring force and opening hydraulically.

According to the present invention, it is proposed that the space for installation of the brake be totally enclosed in order to avoid high drag torque. In this connection, two openings towards the transmission sump are provided in the lower part of the brake housing. An oil inlet and an oil outlet are further provided. The oil inlet is preferably provided at the front of the brake housing and discharges into the internal disk support. The oil outlet is provided at the circumference of the brake housing at the height of the disk pack.

The oil level in the brake housing can be reduced to below the disk level via an air pump incorporated in the transmission. The air pump can optionally be operated with the output speed or with the motor speed. The brake housing is upwardly vented during braking, thereby allowing the oil level to rise in the brake housing due to the lack of counter pressure.

The rotary disk brake linings generate a radial oil flow through the disk pack, such that cooling oil flows into the disk pack, via the supply channel, and back into the transmission sump via the outlet. As soon as the brake is deactivated, the vent closes and the air pump again reduces the oil level to its minimum at the lower edge of both the openings in the brake housing.

The brake incorporated in the transmission according to the present invention is cooled by the circulating lubricating oil and the thermal energy transferred to the oil is dissipated via the transmission oil cooler. This ensures effective cooling of the brake by means of already available components, which has a positive effect on manufacturing costs.

According to the present invention, venting and/or operating the parking brake 3 is achieved via the pressure oil supplied by the transmission oil pump, so that the parking brake 3 may be advantageously controlled by a proportional valve via the transmission electronic system. Hence, the braking power of the parking brake may be metered and controlled, via the transmission electronic system. In addition, the parking brake 3 may be operated independently of the main brake 2 system available in the motor vehicle.

In line with the procedure for the operation of the parking brake 3, it is proposed to use the parking brake 3 as an auxiliary for the main brake 2 and as a sustained-action brake, for example during long downhill drives.

Along this line, the parking brake and/or the main brake may be engaged, via the transmission electronic system, while operating the brake pedal in its first range of travel. The main brake 2 and/or the parking brake 3 are additionally engaged only when the brake pedal is pressed further down. Thus, the main brake 2 of the motor vehicle is relieved and more braking power is made available.

If the parking brake 3 is actuated while operating the brake pedal in its first range of travel, according to the present invention, this first step may also be used as a sustained-engagement brake during long downhill drives. In line with an advantageous development, engagement of the parking brake 3 when used as a sustained-action brake, is automated and depends on the set values of the output speed and the input torque (shear torque) of the transmission.

Use of the inventive parking brake 3 also makes simulation of hydrostatic driving characteristic during deceleration of the vehicle possible, as will be explained hereinafter.

According to the present invention, upon initiation of the hydrostatic driving characteristic, the following magnitudes apply as set values: The engine speed and/or the charge state of the converter, the output speed gradient (i.e. deceleration gradient of the vehicle), the position of the accelerator pedal and position of the preselector lever for the deceleration gradient. Accordingly, the main brake 2 can be engaged automatically by adequate operation of throttling, and at the same time decelerate the motor vehicle without active intervention of the driver. The deceleration gradient may be preselected via the preselector lever or determined via the shear torque level.

According to the present invention, the parking brake 3 may be used as an aid for reversing drive when the driving direction is changed, for example in the case of a shovel dozer which changes its driving direction frequently. According to the state of the art, the energy for deceleration during rearward driving is dissipated in the converter as well as in the reverse clutch, where the energy is simultaneously be supplied via the motor 4 on the pump side of the converter for torque support in the converter. The brake incorporated in the transmission may advantageously be used for decelerating the vehicle, whereby the accumulation of heat is dissipated via the transmission cooling system, as already explained. Thus, lowering the motor power required during deceleration, and increasing the power available for further components, increasing the respective fuel savings. In addition to the above mentioned set values, the output speed and driving speed may be used.

Subject to the driver's choice, additional engagements and/or control options of the parking brake 3 may be provided. Brake activation may, for example, be controlled by means of a load dependent or path dependent measurement, the controller being arranged with additional sensors.

Overload or destruction due to improper use is avoided by means of the control incorporated in the transmission control according to the present invention.

REFERENCE NUMERALS

1 Transmission housing
2 Main brake
3 Parking brake
4 Drive motor

The invention claimed is:
1. A motor vehicle having a main brake and a parking brake connected to a transmission, the motor vehicle comprising:
the main brake is operable independent of the parking brake and has a brake pedal which is located within the motor vehicle, and the brake pedal enables activation of the main brake;
the parking brake being operable, independently from the main brake, the parking brake is the parking bake for the motor vehicle and at least one of an auxiliary brake, for providing braking assistance to the main brake, and a sustained-action brake for sustained braking of the motor vehicle;
a transmission electronic system controls a proportional valve which hydraulically controls the parking brake such that the transmission electronic system meters and controls braking power of the parking brake;
the brake pedal has a first range of travel and a further range of travel, depression of the brake pedal within the first range of travel commences engagement of one of the parking brake and the main brake, and depression of the brake pedal within the further range of travel commences engagement of the other one of the main brake and the parking brake such that one of braking power of the main brake and the parking brake are combined with one another.

2. The motor vehicle according to claim 1, wherein the parking brake is automatically engaged by an adequate throttling operation and a deceleration gradient is one of preselected by a preselector lever and determined and specified, via a shear torque level.

3. The motor vehicle according to claim 1, wherein the parking brake is incorporated within the transmission of the motor vehicle.

4. The motor vehicle according to claim 1, wherein the parking brake is a rotary disk brake located in an oil bath.

5. The motor vehicle according to claim 1, wherein the parking brake is arranged within the transmission between a last gear clutch and an output flange.

6. The motor vehicle according to claim 1, wherein the parking brake is located within the transmission in a transmission sump.

7. The motor vehicle according to claim 6, wherein the parking brake is enclosed within an installation space, and the installation space communicates with a transmission sump, located at a lower part of the transmission housing, via an oil inlet and an oil outlet.

8. The motor vehicle according to claim 7, wherein the oil inlet is located on a front of a brake housing and ends in an internal disk support, and the oil outlet is located on a circumference of the brake housing at a height of a disk pack.

9. The motor vehicle according to claim 8, wherein an oil level within the brake housing is reduced to below the height of the disk pack, when the parking brake is inactive, to avoid a high drag torque.

10. The motor vehicle according to claim 8, wherein an oil level within the brake housing is reduced, via an air pump which is incorporated within the transmission, and is operated by one of an output speed and a motor speed, a vent is opened to vent upwardly the brake housing during braking and allow the oil level within the brake housing to rise and, upon conclusion of braking, the vent is closed to reduce the oil level within the brake housing to a minimum level with the minimum level being defined by a lower edge of both the inlet opening and the outlet opening.

11. The motor vehicle according to claim 10, wherein the oil made available by a transmission oil pump at least one of vents and activates the parking brake.

12. The motor vehicle according to claim 8, wherein rotating disk brake linings generate a radial flow of cooling oil through the disk pack, the flow of cooling oil is directed into the disk pack, via a supply channel, and then into the transmission sump, via the outlet opening.

13. The motor vehicle according to claim 1, wherein the parking brake is a negative clutch which is engaged by a spring force and disengage by a hydraulic force.

14. The motor vehicle according to claim 1, wherein thermal energy, produced by the parking brake during braking, is transferred to oil circulating in the transmission to cool the parking brake and the heated oil is then dirceted to a transmission oil cooler.

15. The motor vehicle according to claim 1, wherein the parking brake is operable independently of a main brake system which is available in the vehicle.

* * * * *